April 14, 1931.   J. GALEMMO   1,800,725
TIRE LOCK
Filed Oct. 18, 1927
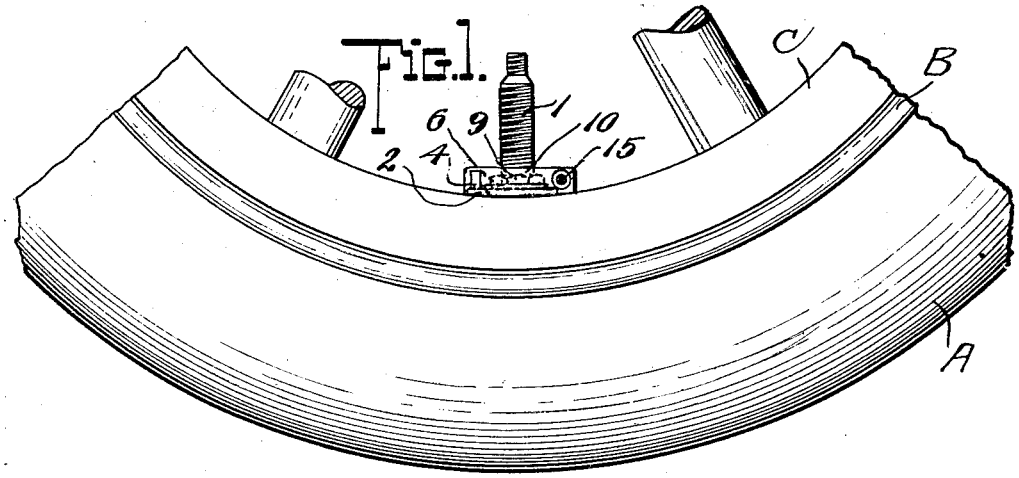
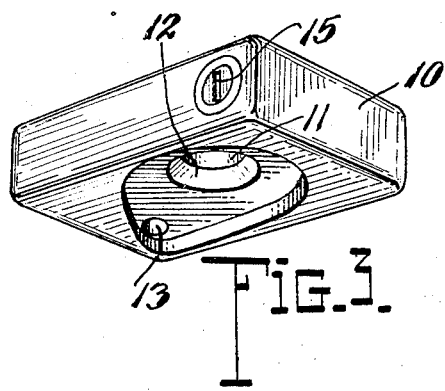
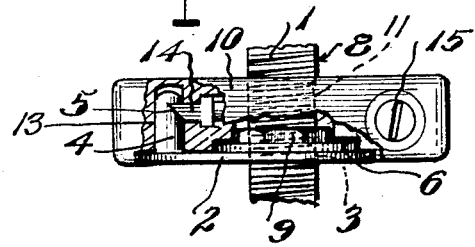
Inventor
Joseph Galemmo
By Robb + Robb
Attorney Patented Apr. 14, 1931

1,800,725

UNITED STATES PATENT OFFICE

JOSEPH GALEMMO, OF CLEVELAND, OHIO, ASSIGNOR OF ONE-HALF TO E. W. PARSONS, OF CLEVELAND, OHIO

TIRE LOCK

Application filed October 18, 1927. Serial No. 226,930.

The present invention is directed to a device which will lock a tire to a wheel while the tire is in service.

Among the objects of this invention is to provide instrumentalities which will cooperate with the valve stem of an inner tube in effectively preventing removal of a tire from an automobile except by an authorized person. In carrying out this idea a locking plate is placed over the valve stem adjacent the felly of the wheel. This locking plate has a projection which is adapted to enter an opening in a lock. A lock is provided in the form of a block having an opening through which the valve stem is adapted to pass, together with another opening to receive the projection on the locking plate. The lock also has a recess or counterbore to receive the conventional type nut commonly threaded on the valve stem. As will hereinafter be more fully described, it will be necessary to first remove the lock in order to take the tire from the wheel.

A more detailed feature of this invention is the novel construction of a lock employed in conjunction with the remainder of the instrumentalities for locking the tire on the wheel. This lock includes mechanism which permits of its being placed on a valve stem without using a key, while the use of a key is necessary for operating the lock to permit of its removal.

Another highly important object is to provide means for preventing the rotation of the lock, locking plate and nut around the valve stem. In attaining this end, I have designed a locking washer which is adapted to be interposed between the locking plate and the nut for effectively preventing rotation of these parts.

Various other more detailed objects and advantages will in part become apparent and in part be stated as the description of the invention progresses.

For a complete understanding of the invention references may be had to the following description and accompanying drawings, in which:

Figure 1 is a side view of a portion of a wheel and tire including my improved locking means, certain of the parts being shown in elevation and other parts in section, the tire and wheel being broken away.

Figure 2 is an enlarged, detailed side view, showing the application of the locking means to the valve stem, parts being broken away and shown in section.

Figure 3 is a detailed perspective of the lock, showing more particularly the nut receiving counterbore.

Figure 4 is a detailed perspective of the locking plate, bringing out the projection thereon which enters into an opening in the lock.

Figure 5 is a detailed perspective of the nonrotatable washers employed in conjunction with the rest of the locking means.

While the preferred form of the invention is herein set forth, it is to be understood that I am not to be limited to the exact construction because various modifications of these details may be provided in putting the invention into practice within the scope of the appended claim.

A portion of a tire is designated in Figure 1 of the drawings by the reference character A. The tire A is carried by a rim B which is mounted on a wooden felly C in the well known manner. A valve stem 1 projects from the inner tube of the tire through openings in the rim and felly as is customary. A locking plate 2, having an opening 3 therein through which the valve stem is adapted to pass is positioned adjacent to the felly. If it is found desirable the lower surface of the locking plate may be slightly curved to conform with the curvature of the wheel, and, under some circumstances it may be found desirable to fasten the locking plate to the felly in some suitable manner. The locking plate 2 is preferably noncircular in formation and at a point removed from the opening 3 upstands a projection 4 having a notch 5 therein. This projection is adapted to enter an opening in a lock in a manner to be hereinafter described for the effective operation of the device.

If the locking plate is secured to the felly of the wheel no provision need be made for preventing rotation of the various parts. However, in the preferred form of the invention a washer 6, having an opening therein with a flat side 7, is positioned above the locking plate and lies flat thereagainst. The flat side 7 cooperates with a flat portion 8 on the valve stem to prevent relative rotation between these parts. Screwed on the valve stem above the washer 6 is a nut 9 of a type commonly employed to hold the valve stem in position. When the device is assembled for use this nut 9 is threaded down tight against the washer 6.

A lock 10, of any suitable formation, has an opening 11 therein, through which the valve stem 1 is adapted to pass. On the bottom side of the lock is a counterbore 12 surrounding the opening 11. This counterbore is of the requisite size to receive the nut 9 when the lock is put over the valve stem. The opening 13, also in the under face, receives the projection 4 on the locking plate 2. The lock 10 includes certain locking instrumentalities, such as a sliding bolt 14 having a bevelled end for engagement with the notch 5. The sliding bolt 14 is normally held in locking position by a spring (not shown), but may be displaced from this position by operating a key in the keyhole opening 15 in one side of the lock.

The assembly and operation of the device is as follows: The tire is placed on the wheel in the usual manner with the valve stem 1 extending through the opening in the felly. The lock plate 2 is then placed over the valve stem, as is the washer 6. The nut 9 is then screwed down tight against the washer and the lock 10 is slipped over the valve stem so that the opening 13 surrounds the projection 4. Upon downward movement of the lock the bevelled end of the sliding bolt 14 in the lock will engage with the top of the projection 4 which will cause it to be moved inwardly. Upon the lock being moved down further the end of the bolt 14, due to the action of the spring actuating the same, will engage the notch 5 and cannot be withdrawn from the valve stem until the lock has been operated by a key to withdraw the bolt 14 from the notch. While in the locked position the nut 9 is received in the counterbore 12 and is absolutely inaccessible to any person desirous of removing the tire from the wheel. The washer 6 prevents the simultaneous rotation of the various parts.

Having thus described my invention what I claim as new, and desire to secure by Letters Patent of the United States, is:

The combination, with a threaded valve stem, of a locking plate, a nut threaded on the valve stem, a lock having an opening through which the valve stem passes, said lock being recessed to receive and enclose the locking plate, and means for interlocking the locking plate and lock, whereby the removal of the various parts from the valve stem is prevented.

In testimony whereof, I affix my signature.

JOSEPH GALEMMO.